US008712954B2

(12) United States Patent
Tsuchiya

(10) Patent No.: US 8,712,954 B2
(45) Date of Patent: Apr. 29, 2014

(54) IMAGE FORMING APPARATUS AND INFORMATION PROCESSING APPARATUS

(75) Inventor: Tomokazu Tsuchiya, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 13/472,679

(22) Filed: May 16, 2012

(65) Prior Publication Data

US 2012/0303679 A1  Nov. 29, 2012

(30) Foreign Application Priority Data

May 24, 2011  (JP) ................................. 2011-116116

(51) Int. Cl.
  *G06F 17/30*  (2006.01)
(52) U.S. Cl.
  CPC .............................. *G06F 17/30073* (2013.01)
  USPC ........................................................ 707/600
(58) Field of Classification Search
  CPC ................... G06F 17/30073; G06F 17/30076; G06F 17/30522
  USPC .............................................. 7/600; 707/600
  See application file for complete search history.

(56) References Cited

U.S. PATENT DOCUMENTS 7,758,180 B2  7/2010  Kawabata
2006/0048019 A1*  3/2006  Takahashi ....................... 714/48

FOREIGN PATENT DOCUMENTS

| JP | 2006-053783 | 2/2006 |
| JP | 2007-145523 | 6/2007 |
| JP | 2008-026717 | 2/2008 |
| JP | 2010-098557 | 4/2010 |

* cited by examiner

*Primary Examiner* — Thu-Nguyet Le
(74) *Attorney, Agent, or Firm* — IPUSA, PLLC

(57) ABSTRACT

In an image forming apparatus, an operation result output part outputs a result of operation of a component. An operation result information creation part creates operation result information by giving information identification character information, which is determined by the component or the result of operation of the component, to the result of operation of the component. An identifier table stores the information identification character information and a unique identifier related to each other and the result of operation of the component and a unique identifier related to each other. An operation result information conversion part reads the identifier related to the information identification character information from the identifier table and converts the operation result information into after conversion operation result information in which at least the information identification character information is replaced by the identifier. An operation result information storage part stores the after conversion operation result information.

6 Claims, 17 Drawing Sheets

FIG.7A

| KIND OF LOG | OUTPUT ORIGINATOR PROGRAM | LOG GENERATION TIME | PARAMETER | PARAMETER | ... |
|---|---|---|---|---|---|
| CARRIAGE STOP DETECTION | CARRIAGE POSITION DETECTION PROGRAM | 123456 sec. | VALUE | - | ... |

HEADER PART / PARAMETER PART

FIG.7B

| KIND OF LOG | OUTPUT ORIGINATOR PROGRAM | LOG GENERATION TIME | PARAMETER | PARAMETER | ... |
|---|---|---|---|---|---|
| 1 | 1 | 123456 sec. | VALUE | - | ... |

FIG.8

| KIND OF LOG | | OUTPUT ORIGINATOR PROGRAM | | PARAMETER | | |
|---|---|---|---|---|---|---|
| KIND NAME | CODE | PROGRAM NAME | CODE | KIND OF PARAMETER | CODE | VALUE |
| CARRIAGE STOP DETECTION | 1 | CARRIAGE POSITION DETECTION PROGRAM | 1 | STOP POSITION | | VALUE |
| CARRIAGE CURRENT POSITION DETECTION | 2 | CARRIAGE POSITION DETECTION PROGRAM | 1 | CURRENT POSITION | | VALUE |
| MAIN SCANNING MOTOR OPERATION | 3 | MAIN SCANNING MOTOR DRIVE PROGRAM | 2 | START ACCELERATION | 1 | |
| | | | | START CONSTANT SPEED | 2 | |
| | | | | START STOPPING | 3 | |
| ... | | | | | | |

335

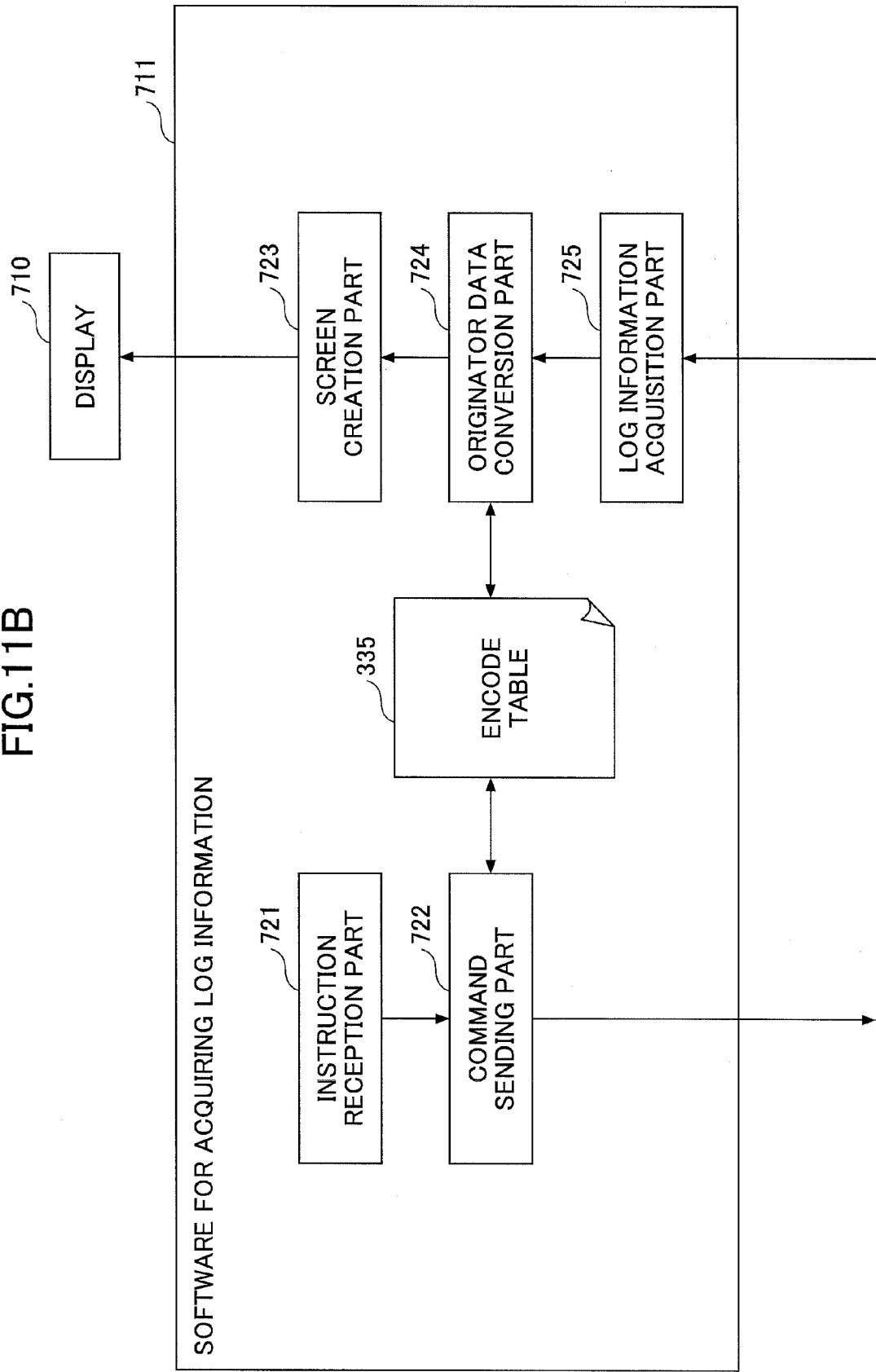

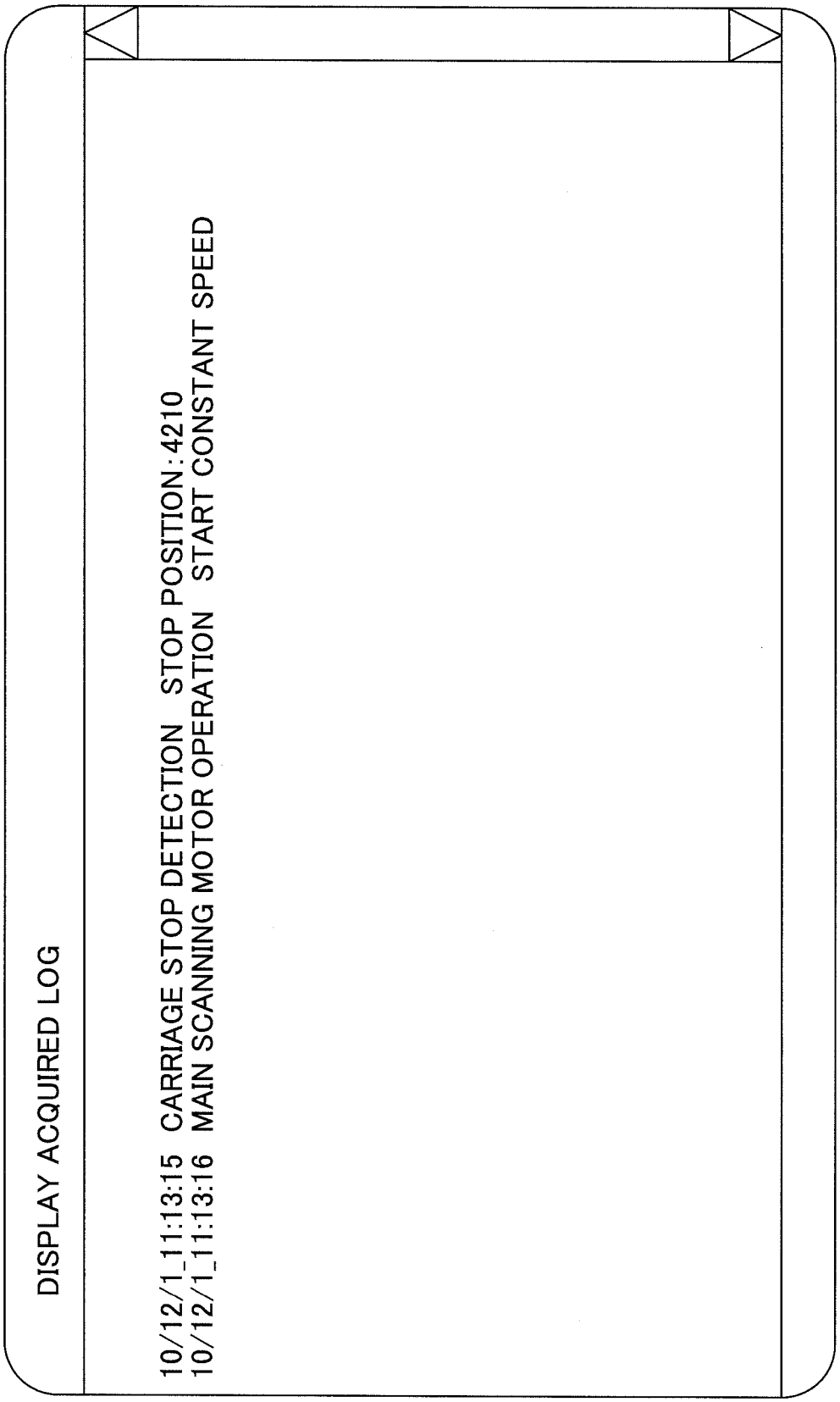

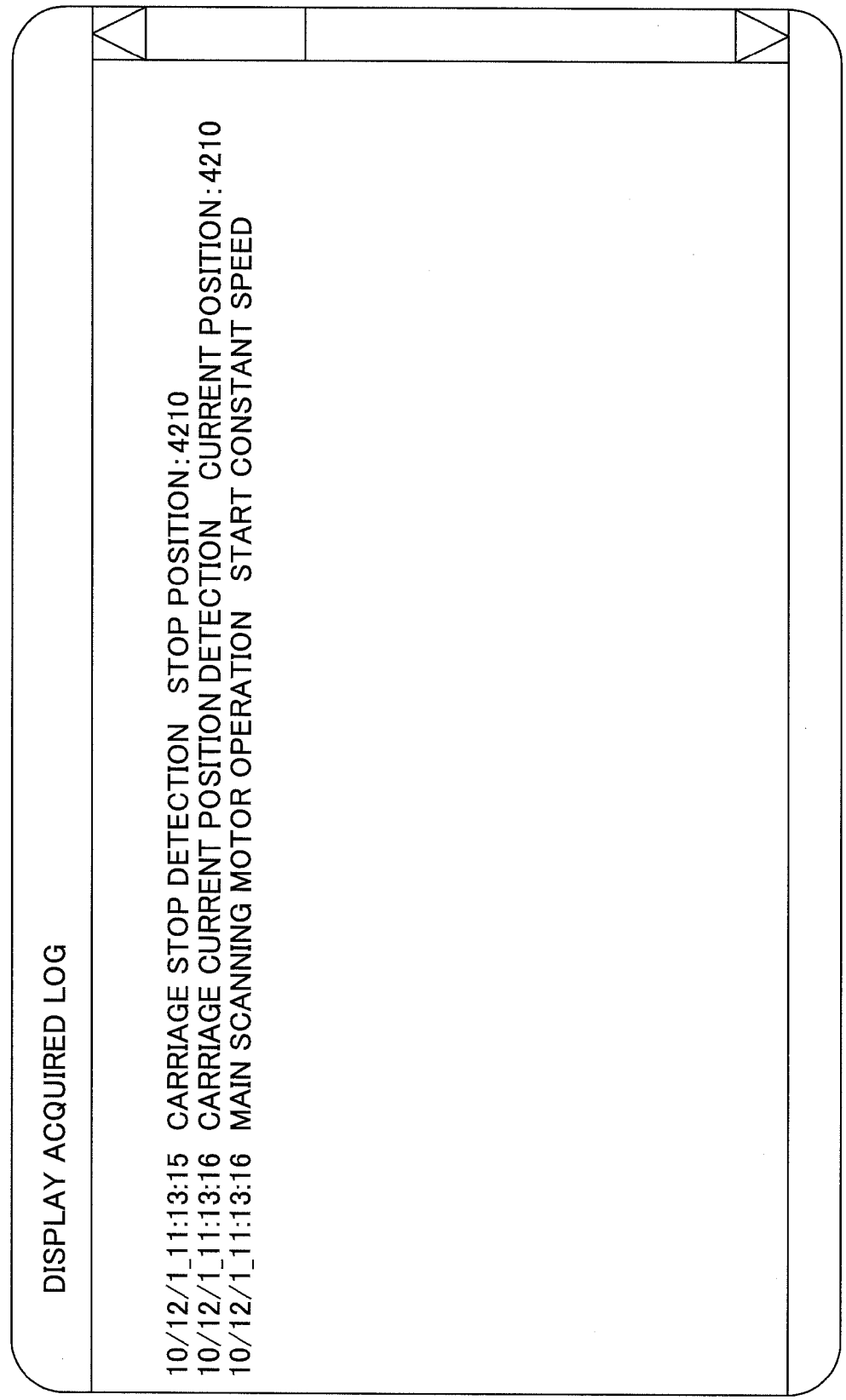

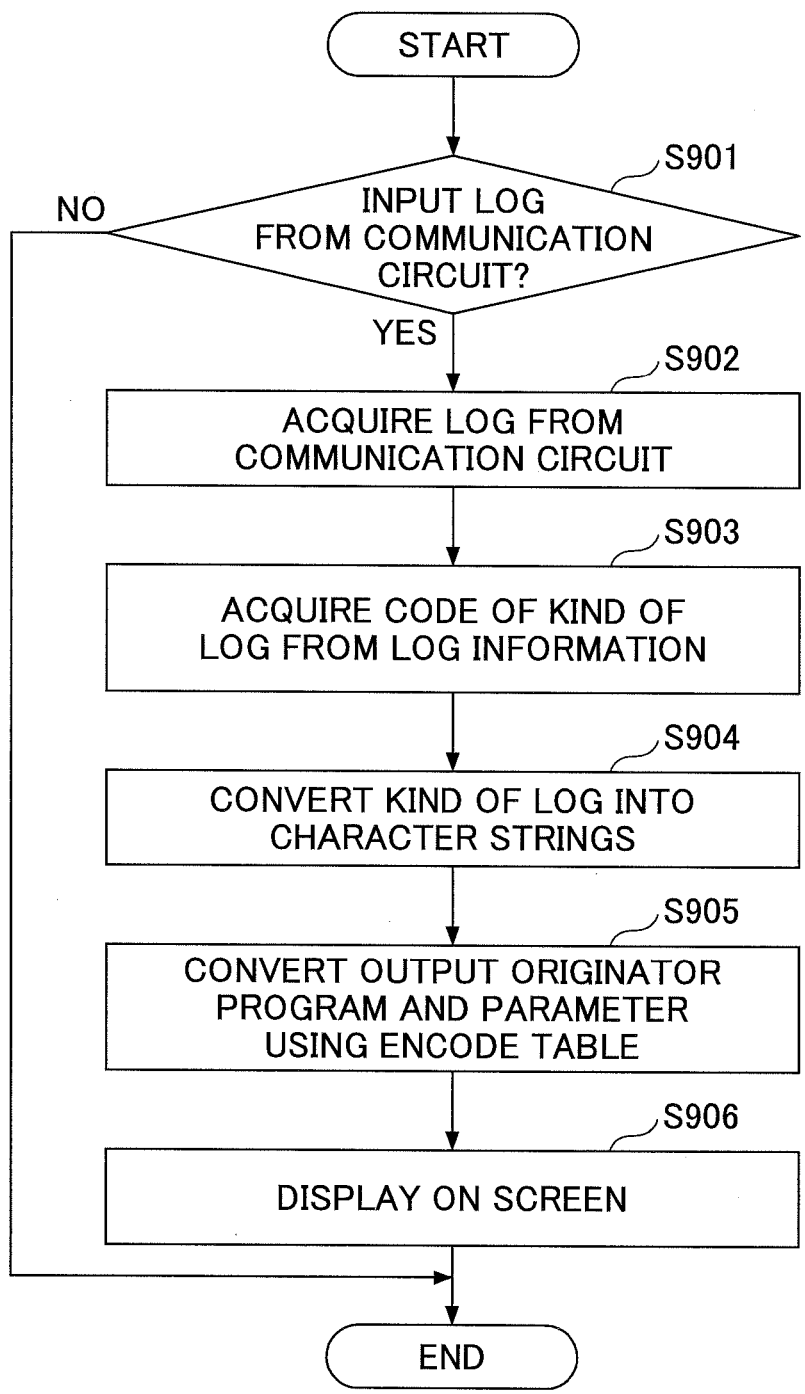

IMAGE FORMING APPARATUS AND INFORMATION PROCESSING APPARATUS

BACKGROUND OF THE INVENTION

1. Field of the Invention

The present invention relates to an image forming apparatus and information processing apparatus that can create log information.

2. Description of the Related Art

Usually, a multi-function peripheral having functions of, for example, a printer, a copy machine, a facsimile machine, a scanner, etc., is equipped with a function of recording operation contents (hereinafter, recorded data is referred to as log information). Such equipment performs a printing operation by driving a movable part by operating a motor, a relay and a clutch of the equipment in response to a print command supplied from an operation panel or a personal computer (PC). Additionally, maintenance work is done on the equipment in response to a user operation or a use condition of the printer function such as a number of sheets of paper supplied. Thus, each kind of operation of the equipment is recorded in the log information. The log information has been used as one of pieces of information for checking whether equipment is operated normally.

However, recording log information may generate a load to equipment, which tends to increase in recent years. The reason for the increase in load is that if the equipment performs, for example, a printing operation, a various modules such as a carriage, a photosensitive drum, a paper supply device, a fixation device, etc., are operated, so that log information is created for each of the operations of the modules. Additionally, because the equipment performs a printing operation or the like, which is an original operation of the equipment, while the equipment creates log information, such an increase in the load is made more remarkable by the creation of log information and the printing operation being performed simultaneously.

Moreover, if a maintenance person or a maintenance device tries to check the contents of operations of the equipment in more detail, it is requested for the log information to contain more detailed information. Accordingly, the log information may contain various kinds of data such as data for output originator module of the log information, a time stamp, an operation parameter at a current time point. Thus, a recording area necessary for recording the log information is increased, which causes a problem in that it takes a long time for the maintenance person or the maintenance device to retrieve the log information.

There is suggested a technique to reduce a load when creating log information to solve a problem that a load to a CPU is large (for example, refer to Japanese Laid-Open Patent Application No. 2006-53783). This patent document discloses an information collecting apparatus for collecting log information without applying a large load to a CPU of a measured device. The load to the CPU is reduced by omitting a process of writing log information in a non-volatile memory by the measured device by collecting operation information directly from a software operation log creation part of the measured device.

Moreover, there is suggested a technique to facilitate retrieval of log information (for example, refer to Japanese Laid-Open Patent Application No. 2010-98557). This patent document discloses an image processing apparatus for retrieving log information by creating log retrieval condition from a log retrieving operation condition which is input according to the same input method as the input method of the operation condition, wherein operation execution history with respect to execution of image processing operations are stored together with operating conditions with respect to specific kinds of operation.

SUMMARY OF THE INVENTION

It is a general object of the present invention to provide an image forming apparatus and an information processing apparatus in which the above-mentioned problems are eliminated.

A more specific object of the present invention is to provide an image forming apparatus and an information processing apparatus which can reduce a load due to creation of log information and reduce a recording capacity necessary for recording log information.

In order to achieve the object, there is provided according to one aspect of the present invention an image forming apparatus, including: an operation result output part configured to output a result of operation of a component; an operation result information creation part configured to create operation result information by giving information identification character information, which is determined by the component or the result of operation of the component, to the result of operation of the component; an identifier table in which the information identification character information and a unique identifier are related to each other and the result of operation of the component and a unique identifier are related to each other; an operation result information conversion part configured to read the identifier related to the information identification character information from the identifier table and convert the operation result information into after conversion operation result information in which at least the information identification character information is replaced by the identifier; and an operation result information storage part configured to store the after conversion operation result information.

According to the present invention, an image forming apparatus and an information processing apparatus can reduce a load due to creation of log information and reduce a recording capacity necessary for recording log information.

Other objects, features and advantages of the present invention will become more apparent from the following detailed description when read in conjunction with the accompanying drawings.

BRIEF DESCRIPTION OF THE DRAWINGS

FIGS. 7A and 7B are illustrations of log information;

FIG. 8 is an illustration of an encode table;

FIG. 11B is a functional block diagram of the personal computer illustrated in FIG. 11A.

FIGS. 13A and 13B are illustration of a log display screen displayed on the display of the personal computer;

FIG. 15 is a flowchart of a procedure of displaying log information sent from the image forming apparatus.

DETAILED DESCRIPTION OF THE PREFERRED EMBODIMENTS

A description will be given below, with reference to the drawings, of embodiments of the present invention.

Figure 1:
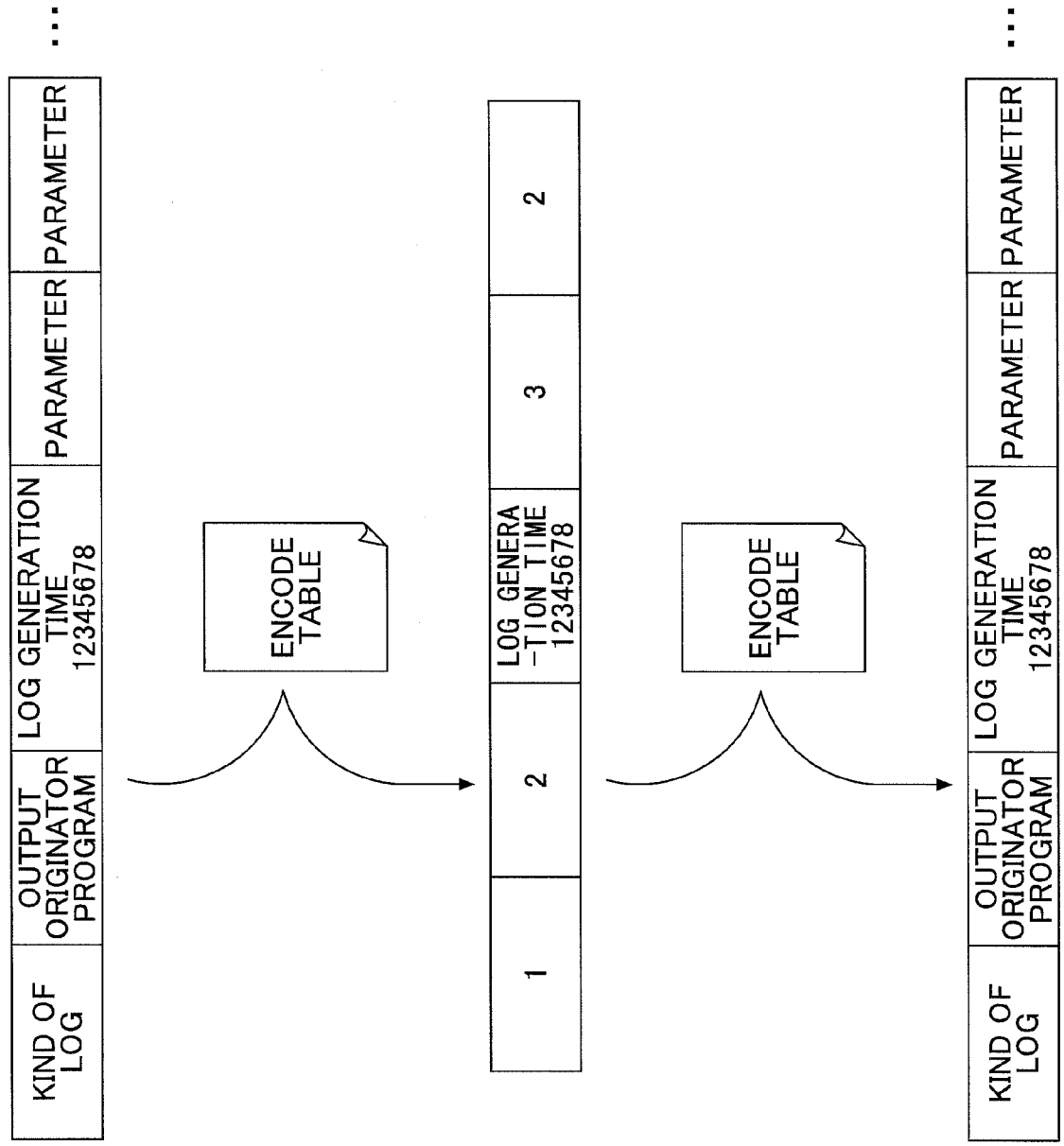
FIG. 1 is an illustration of log information according to an embodiment of the present invention.

FIG. 1 is an illustration for explaining log information according to an embodiment of the present invention. For example, the log information contains "kind of log", "output-originator program", "log generation time" and "parameter". An image forming apparatus encodes the log information using an encode table. Registered in the encode table are unique identifiers related to respective columns of "kind of log", "output-originator program", "log generation time" and "parameter". The contents of the log information indicate meaningful information (hereinafter, may be referred to as character string information), which includes a plurality of characters, numerals and signs, in many cases. Accordingly, information including a number of bits of one character (16 bits for double-byte)×a number of characters is required.

However, if there are 8 kinds in the "kind of log", the "king of log" can be recorded using a memory area of 3 bits, which can represent 8 at maximum. In FIG. 1, "kind of log", "output-originator program", "log generation time", "parameter" and "parameter" are encoded as "1", "2", "1", "3" and "1", respectively. Thus, the memory area for recording the log information can be greatly reduced by encoding the log information.

A retrieval time can also be reduced by using the codes. The image forming apparatus retrieves log information according to the codes when a user selects log information to be retrieved through, for example, an external personal computer (PC), etc. Then, after the retrieval, the image forming apparatus decodes the encoded log information to the character string information before encoded. In order to restore the state before encoding, the "kind of log" corresponding to the code is read by referring to the encode table.

As mentioned above, the image forming apparatus according to the present embodiment can compress the log information by relating each item of the log information to a code. Additionally, a retrieval time can be reduced because the codes are used when retrieving the log information. Further, readability of the log information by a user can be improved by converting the log information into the character string information when using the log information.

[Example of Structure]

Figure 2:
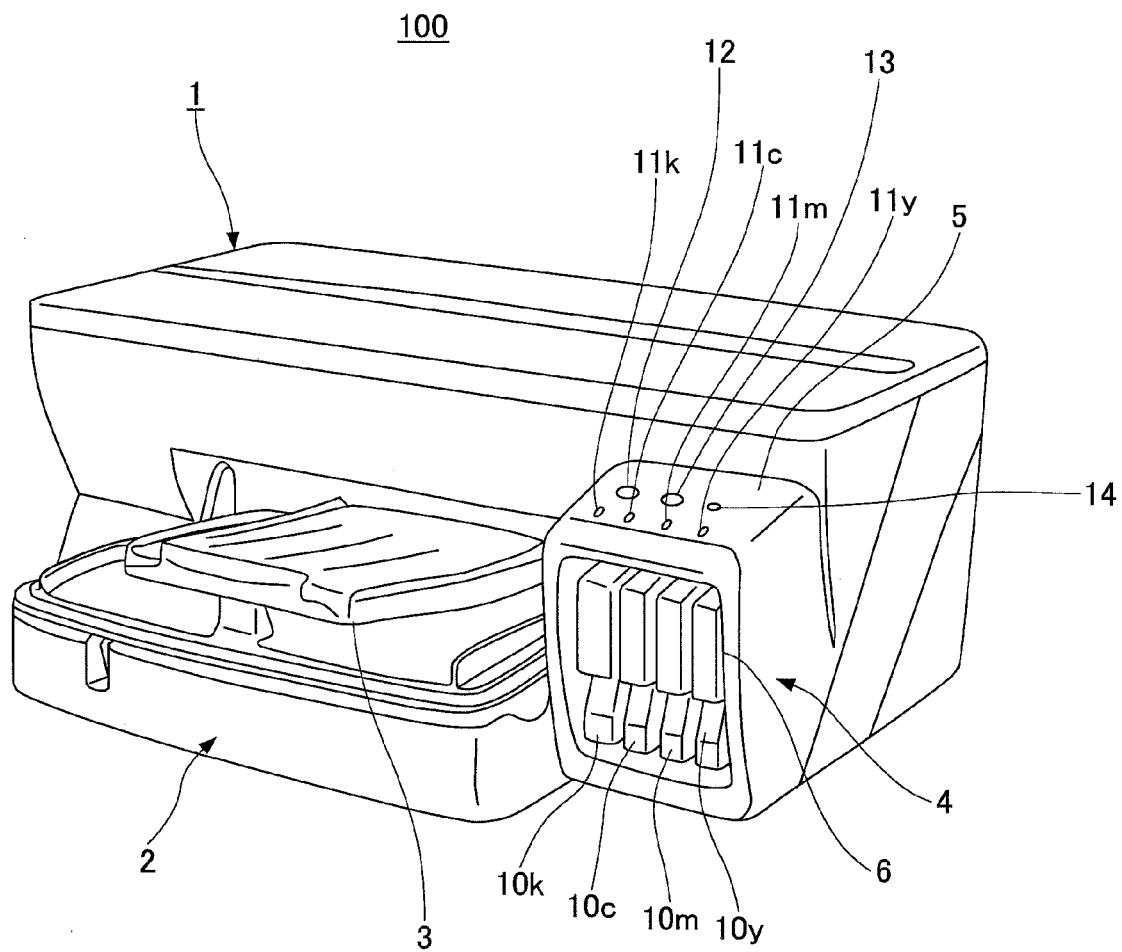
FIG. 2 is a perspective view of an image forming apparatus according to an embodiment of the present invention.

FIG. 2 is an outline perspective view of an image forming apparatus 100.

The image forming apparatus 100 is a so-called ink-jet type printer that discharges ink droplets to form an image. A description will be given below of a structure of the image forming apparatus 100. Because the present embodiment mainly relates to recording of log information, any image forming method such as an electrophotographic method may be used in the image forming apparatus 100.

The image forming apparatus 100 is equipped with a paper supply tray 2 attached to an apparatus body 1 and a paper eject tray 3 detachably attached to the apparatus body. The paper supply tray 2 is provided for setting recording papers to the image forming apparatus 100. The paper eject tray 3 stores recording papers on which images have been formed by the image forming apparatus 100. A cartridge loading part 4 is provided on a side of the paper supply and eject tray part on a front face of the apparatus body 1. The cartridge loading part 4 provides a space for attaching ink cartridges so that the attached ink cartridges protrude forward from the apparatus body 1. The top surface of the cartridge loading part serves as an operation/display part 5 in which operation buttons and indicators are arranged.

A plurality of ink cartridges 10 are attached to the cartridge loading part 4. The plurality of ink cartridges 10 store different color recording liquids (inks) such as, for example, black (K) ink, cyan (C) ink, magenta (M) ink, yellow (Y) ink, etc., respectively. Hereinafter, when distinguishing by color, the ink cartridges are referred to as ink cartridges 10k, 10c, 10m and 10y, respectively. The ink cartridges 10 are attached to the apparatus body 1 by being pressed from the front side toward the rear side of the apparatus body 1. A cover (cartridge cover) 6 is provided on the front face of the cartridge loading part 4 so that the cover 6 can be opened when attaching or detaching the ink cartridges 10.

Remaining-amount display parts 11k, 11c, 11m and 11y are arranged at positions corresponding to the attaching positions (arranging positions) of the ink cartridges 10k, 10c, 10m and 10y on the operation/display part 5. Each of the remaining-amount display parts 11k, 11c, 11m and 11y indicates states of a remaining amount of ink (small amount of ink remaining, no ink remaining, etc) by lighting a lamp in different colors. A power button 12, a paper feed/print restart button 13 and cancel button 14 are arranged on the operation/display part 5.

Figure 3:
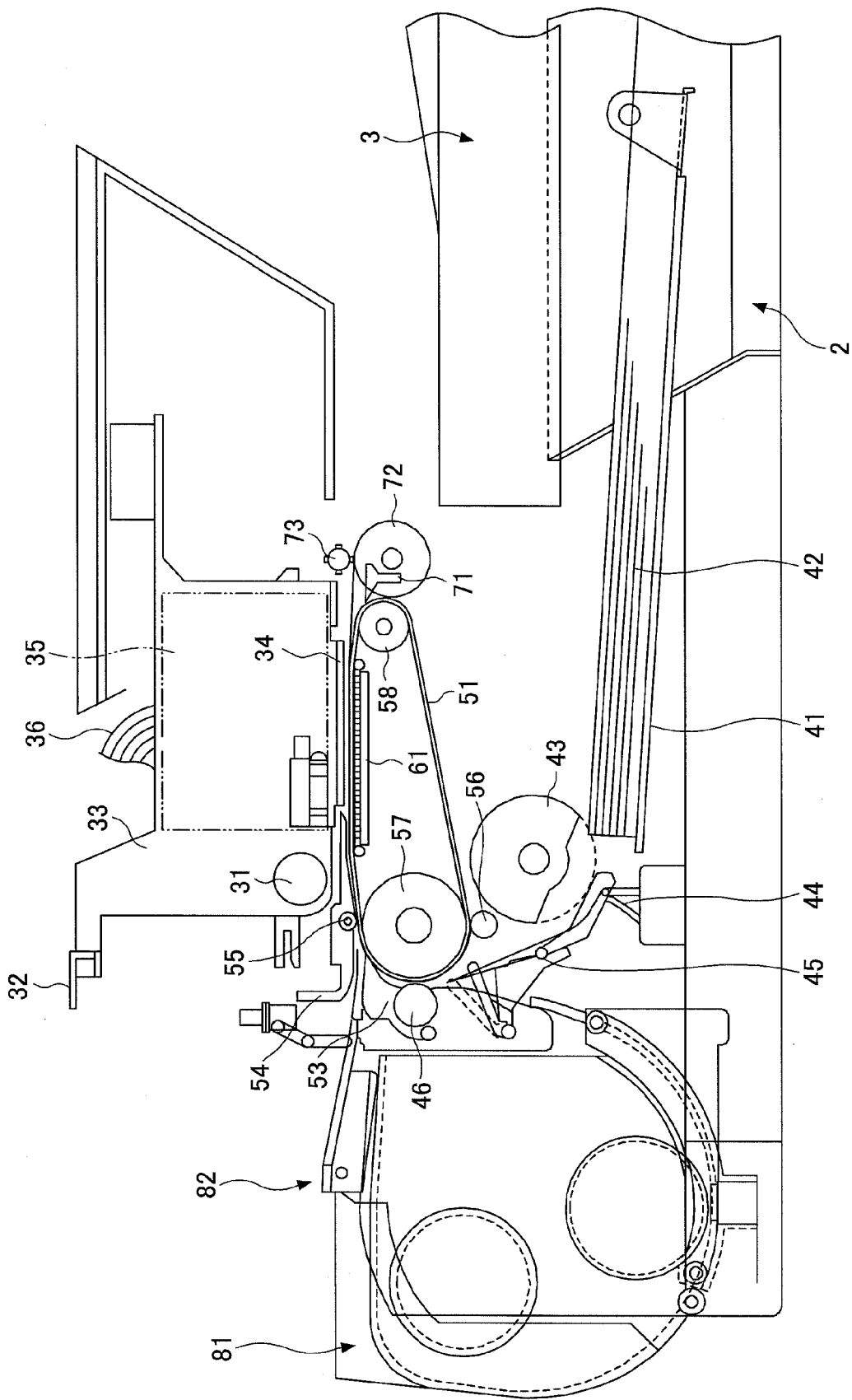
FIG. 3 is a side view of the image forming apparatus illustrated in FIG. 2.
Figure 4:
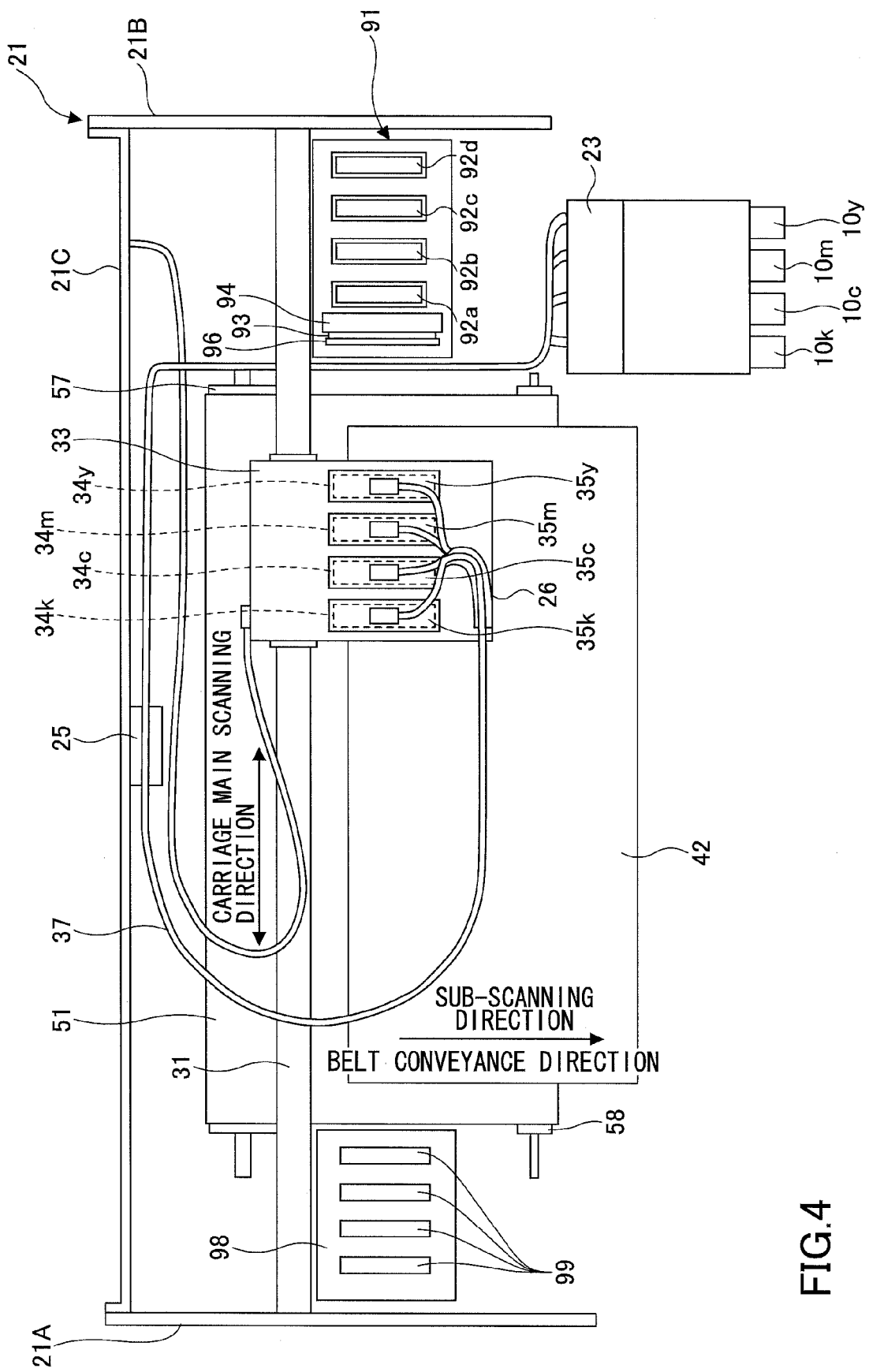
FIG. 4 is a plan view of a part of the image forming apparatus.

FIG. 3 is a side view of the image forming apparatus 100. FIG. 4 is a plan view of a part of the image forming apparatus 100.

A carriage 33 is movably supported by a guide rod 31 and a stay 32 bridging between left and right side plates 21A and 21B. The carriage 33 is reciprocably movable in a main-scanning direction (a carriage scanning direction indicated by an arrow in FIG. 4) by being driven by a main-scanning motor (not illustrated in the figure). A plurality of recording heads 34 are attached to the carriage 33. Each of the recording heads 34 is a liquid discharge head for discharging ink droplets. The direction of discharging ink droplets of the recording heads 34 is a downward direction. Each of the recording heads 34 has a plurality of nozzles arranged in a direction perpendicular to the main-scanning direction.

The recording heads 34 include, for example, a recording head 34y for discharging yellow (Y) ink droplets, a recording head 34c for discharging cyan (C) ink droplets, a recording head 34m for discharging magenta (m) ink droplets, and a recording head 34k for discharging black (K) ink droplets. Hereinafter, the recording heads 34y, 34c, 34m and 34k may be referred to as recording head 34 when there is no need to be distinguished by color. Additionally, the head structure is not limited to the structure illustrated in the figures, and the head structure may be constituted using one or more recording heads having one or more rows of nozzles that discharge liquid droplets of one or more colors.

As a liquid droplet discharge mechanism of the recording head 34, there are a piezoelectric actuator using a piezoelectric device, a thermal actuator using an electrothermal transformation device such as a heat generating resistor to generate a phase change due to film boiling of a liquid, a shape memory alloy actuator using a metal phase change due to temperature changes, and an electrostatic actuator using an electrostatic force. Each of the actuators is a pressure generating unit for generating a pressure to discharge liquid droplets.

The carriage 33 is provided with head tanks 35y, 35m, 35c and 35k for supplying ink of each color to the recording head 34. The head tanks 35y, 35m, 35c and 35k may be referred to as head tank 35 when there is no need to be distinguished by color. The ink cartridge 10 supplies ink of each color to the head tank 35 through ink supply tube 37 of each color. The ink cartridges 10y, 10m, 10c and 10k may be referred to as ink cartridge 10 if there is no need to be distinguished by color.

A supply pump unit 23 is provided in the cartridge loading part 6 for delivering ink in the ink cartridge 10. The ink supply tube 37 between the cartridge loading part 6 to the head tank 35 is fixed to a rear plate 21C constituting a part of a frame 21 by using a body side holder 25. Additionally, the ink supply tube 37 is fixed to the carriage 33 by using a fixing rib 26.

A maintenance and recovery mechanism 91 is arranged in a non-printing area on one side of the main-scanning direction of the carriage 33. The maintenance and recovery mechanism 91 includes a recovery unit for maintaining and recovering a state of the nozzles of the recording head 34. The maintenance and recovery mechanism 91 is provided with cap members 92a through 92d (hereinafter, may be referred to as cap 92), a wiper blade 93, and an empty discharge receiver 94, etc. The cap 92 is used to cover the nozzle surface of the recording head 34. The wiper blade 93 is a blade member for wiping the nozzle surface. The empty discharge receiver 94 receives liquid droplets which do not contribute to recording and are discharged from the recording head 34 to eject recording liquid of which viscosity has been increased. Here, the cap 92a is used as a suction and moisture-maintaining cap, and other caps 92b through 92d are used as moisture-maintaining caps.

Moreover, an empty discharge receiver 98 is arranged in a non-printing area on the side of the side plate 21A. The empty discharge receiver 98 receives liquid droplets, which do not contribute to recording, discharged by recording head 34 in order to eject recording liquid of which viscosity is increased while recording. The empty discharge receiver 98 is provided with openings 99 arranged along the direction of arrangement of the nozzles of the recording head 34.

On the other hand, as illustrated in FIG. 3, a paper supply part is provided on a bottom plate 41 (paper placing part) of the paper supply tray 2. The paper supply part is a feed unit for supplying the recording paper 42 (hereinafter, may be referred to as paper 42) placed on the paper supply tray 2. The paper supply part includes a semi-lunar roller 43 (paper supply roller) and a separation pad 44 made of a material having a large coefficient of friction. The semi-lunar roller 43 separates and feeds the paper 42 from the paper supply tray 2 one after another. The separation pad 44 faces the paper supply roller 43 and is urged toward the paper supply roller 43.

The paper 42 fed from the paper supply part is conveyed to the conveyance belt 51 by a counter roller 46 that is urged toward a conveyance roller 57 while being guided along a guide member 45. The conveyance belt 51 conveys the paper 42, by attaching the paper 42 thereto by an electrostatic attraction force, to a position opposite to the recording head 34. The conveyance belt 51 is an endless belt that is provided between the conveyance roller 57 and a tension roller 58. The conveyance belt 51 rotatably moves in a belt conveyance direction (sub-scanning direction).

The conveyance belt 51 includes a first surface layer serving as a paper attraction surface and a second surface layer serving as a medium resistance layer or a grounding layer. The first surface layer is formed of a resin material of which resistance is not controlled such as a ETFE pure material having a thickness of about 40 µm. The second surface layer is formed of the same material as the first surface layer and a resistance thereof is controlled by carbon. A charge roller 56 is arranged under the conveyance roller 57 so as to contact with the conveyance belt 52. The charge roller 56 is arranged to contact with the conveyance belt 51 and is rotated in association with rotation of the conveyance belt 51. A predetermined force as a pressure force is applied to opposite ends of the charge roller 56. It should be noted that the conveyance roller 57 also serves as a grounding roller, and is grounded by being brought into contact with the medium resistance layer (back layer) of the conveyance belt 51.

Moreover, a guide member 61 is arranged on the backside of the conveyance belt 51 with respect to a print area printed by the recording head 34. The top surface of the guide member 61 is protruded from a tangential line of the tension roller 58 toward the side of the recording head 34 in order to maintain accurate flatness of the conveyance belt 51.

Furthermore, a separation claw 71 and paper eject rollers 72 and 73 are arranged on the downstream side of the conveyance belt 51. The separation claw 71 is used for separating the paper 42 from the conveyance belt 51. The paper 42 separated from the conveyance belt 51 by the separation claw 71 is ejected onto the paper eject tray 3 on the downstream side of the paper eject roller 72.

Moreover, a both-side paper supply unit 81 is detachably attached to the back part of the apparatus body 1. The both-side paper supply unit 81 draws and reverses the paper 42 returned by the conveyance belt 51 being rotated in a reverse direction and supplies the paper 42 to a position between an end pressure roller 55 and the conveyance belt 51. Moreover, a manual paper feed part 82 is provided on the top surface of the both-side paper supply unit 81.

According to the ink-jet type image forming apparatus 100 having the above-mentioned structure, the paper 42 is separated and fed from the paper supply tray 2 one after another, and the paper 42 fed in a vertically upward direction is guided by the guide member 45. The paper 42 is conveyed by being sandwiched between the conveyance belt 51 and the counter roller 52. Then, the leading edge of the paper 42 is guided by the conveyance guide 53 and is pressed against the conveyance belt 51 by being urged by the end pressure roller 55, which changes the conveyance direction of the paper 42 by about 90 degrees. At this stage, a control part (not illustrated in the figures) controls to apply an alternating voltage, which is repetition of a positive output and a negative output, from an AC bias supply part to the charge roller 56 in order to apply an alternating charge voltage pattern onto the conveyance belt 51. Thereby, a positive voltage and a negative voltage are alternately charged on the conveyance belt 51 in the sub-scanning direction which is a circumferential direction of the conveyance belt 51. When the paper 42 is supplied onto the thus-charged conveyance belt 51, the paper 42 is attracted by the conveyance belt 51 due to an electrostatic attraction force, the paper 42 is conveyed in the sub-scanning direction by the circumferential movement of the conveyance belt 51. After the paper 42 is conveyed to a previously determined position, the image forming apparatus 100 records a single line image by discharging ink droplets onto the paper 42, which is temporarily stopped, while moving the carriage 33 and driving the recording head 34 in response to image signals. Thereafter, the paper 42 is conveyed by a predetermined amount (distance), and recording for a subsequent line is performed. Upon receipt of a recording end signal or a signal indicating the trailing edge of the paper 42 reaches the recording area, the image forming apparatus 100 ends the recording operation, and ejects the paper 42 onto the paper eject tray 43.

During a print (recording) standby state, the carriage 33 is moved to the side of the maintenance and recovery mechanism 91 where the recording head 34 is capped by the cap 92 to maintain the nozzles to be in a moisturized state, which prevents a discharge failure due to dried ink. Additionally, the recording liquid is suctioned from the nozzles by a suction pump (not illustrated in the figure) in the state where the recording head 34 is capped by the cap 92 in order to perform a recovery operation to remove bubbles in the recording liquid and eject the recording liquid of which viscosity is increased. Additionally, before starting recording or during recording, an empty discharge operation is performed to discharge recording liquid which does not relate to the recording. Thereby, a stable discharge performance of the recording head 34 is maintained.

Figure 5:
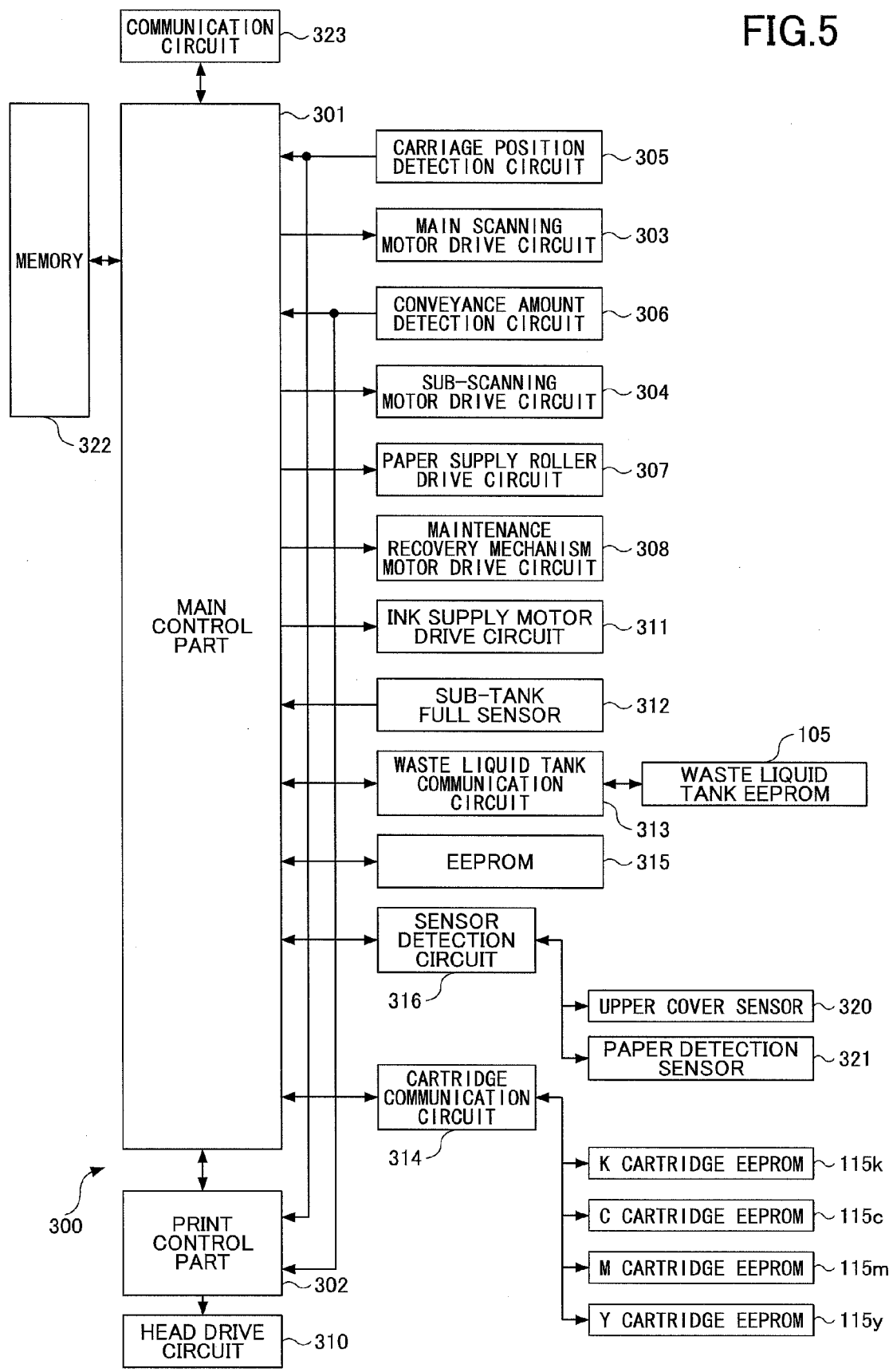
FIG. 5 is a block diagram of a control part of the image forming apparatus.

FIG. 5 is a block diagram of a control part 300. The control part 300 includes mainly a main control part 301 and a print control part 302. The main control part 301 and the print control part 302 are constituted by a microcomputer. The main control part 301 manages a control of the entire image forming apparatus 100, and the printing control part 302 manages a print control. Information regarding a print process such as a print condition, print date, etc., is input to the main control part 301 from a communication circuit 323. The main control part 301 drives a main-scanning motor and a sub-scanning motor (not illustrated in the figure) through a main-scanning motor drive circuit 303 and a sub-scanning drive circuit 304 in order to form an image on the paper 42. Additionally, the main control part 301 controls to send print date to a print control part 302.

A carriage position detection circuit 305, the main-scanning motor drive circuit 303, a conveyance amount detection circuit 306, the sub-scanning motor drive circuit 304, a paper supply roller drive circuit 307, a maintenance and recovery mechanism motor drive circuit 308, an ink supply motor drive circuit 311, a sub tank full sensor 312, a waste liquid tank communication circuit 313, an EEPROM 315, a sensor detection circuit 316, and a cartridge communication circuit 314 are connected to the main control part 301.

The main control part 301 controls the position and moving speed of the carriage 33 based on a detection signal, which is input from the carriage position detection circuit 305 and indicates the position of the carriage 33. The carriage position detection circuit 305 detects the position of the carriage 33 by reading slits of an encoder sheet arranged in the main-scanning direction of the carriage 33 by a photo sensor mounted on the carriage 33 and counting the number of the slits. The main-scanning motor drive circuit 303 drives the main-scanning motor to rotate in response to a carriage moving amount input from the main control part 301 in order to move the carriage 33 to a predetermined position at a predetermined speed.

A detection signal output from the conveyance amount detection circuit 306, which detects a moving amount of the conveyance belt 51, is input to the main control part 301. The control part 301 controls the moving amount and moving speed of the conveyance belt 51 based on the detection signal. The conveyance amount detection circuit 306 detects a conveyance amount of the conveyance belt 51 by reading slits of a rotary encoder sheet attached to a rotation axis of the conveyance roller 57 and counting the number of slits. The sub-scanning motor drive circuit 304 drives the sub-scanning motor to rotate in response to the conveyance amount input from the main control part 301 in order to drive the conveyance roller 57 to rotate to cause the conveyance belt 51 to move to a predetermined position at a predetermined speed.

Moreover, the main control part 301 causes the paper supply roller 43 to make one turn by providing a paper supply roller drive command to the paper supply roller drive circuit 307. The main control part 301 causes the cap 92 to move up and down, the wiper blade 93 to move up and down, and the suction pump to drive by driving a motor (not illustrated in the figure) of the maintenance and recovery mechanism 91 via the maintenance and recovery mechanism drive motor drive circuit 308. The main control part 301 controls driving an ink supply motor for driving the pump unit 23 via the ink supply motor drive circuit 311. Thereby, ink can be supplied from the ink cartridge 10 attached to the cartridge loading part 4 to the head tank 35, and a negative pressure is formed by suctioning ink from the head tank 35 into the ink cartridge 10. At this time, the main control part 301 controls the supply of ink based on a detection signal from the sub tank full sensor 312, which detects a tank full state of the head tank 35 provided to the recording head 34.

The main control part 301 acquires, through the cartridge communication circuit 314, information currently recorded on the nonvolatile memories 115$k$, 115$c$, 115$m$ and 115$y$ provided in each ink cartridge 10 attached to the cartridge loading part 4. The main control part 301 applies a predetermined process to the acquired information, and stores the processed information in the nonvolatile memory (for example, EEPROM) 315.

Based on the carriage position and the conveyance amount of the carriage 33 supplied from the carriage position detection circuit 305 and the conveyance amount detection circuit 306, the print control part 302 creates from print data a drive signal for causing the recording head 34 to discharge liquid droplets, and supplies the drive signal to the head drive circuit 310. The head drive circuit 310 drives a pressure generating unit (for example, a piezoelectric device of a piezoelectric-type head) of the recording head 34 based on the drive signal supplied from the print control part 302 in order to cause the liquid droplets to be discharged from predetermined nozzles.

The main control part 301 acquires, through the waste liquid tank communication circuit 313, information recorded in the EEPROM (nonvolatile memory) 105, which is a recording unit connected to the waste liquid tank. Then, the main control part 301 applies a predetermined process to the acquired information, and records the processed information in the non-volatile memory (for example, EEPROM) 315, which is a body recording unit.

The main control part 301 determines whether the information stored in the waste liquid tank EEPROM 105 can be read by the waste liquid tank communication circuit 313. Thereby, the main control part 301 determines whether the waste liquid tank is attached to the apparatus body 1, which results in detection of existence or nonexistence of the waste liquid tank.

The main control part 301 is connected with a sensor detection circuit 316 for acquiring a state of an image forming apparatus 100. An upper cover sensor 320 and a paper detection sensor 321 are connected to the sensor detection circuit 316. The main control part 301 detects opening of the cover of the apparatus body 1 from a detection signal output from the upper cover sensor 320. Moreover, the main control part 301 checks whether a paper remains in the apparatus body 1, or a paper is fed at the time of paper conveyance based on the detection signal output from the paper detection sensor 321.

In addition, a memory 322 is connected to the main control part 301. The main control part 301 uses the memory 322 as a work area for storing programs for driving various circuits such as the main-scanning motor drive circuit 303, etc. Data such as log information is also temporarily stored in the memory 322. Although the memory 322 is a volatile memory unit in the present embodiment, a non-volatile memory unit may be used as the memory 322.

Figure 6:
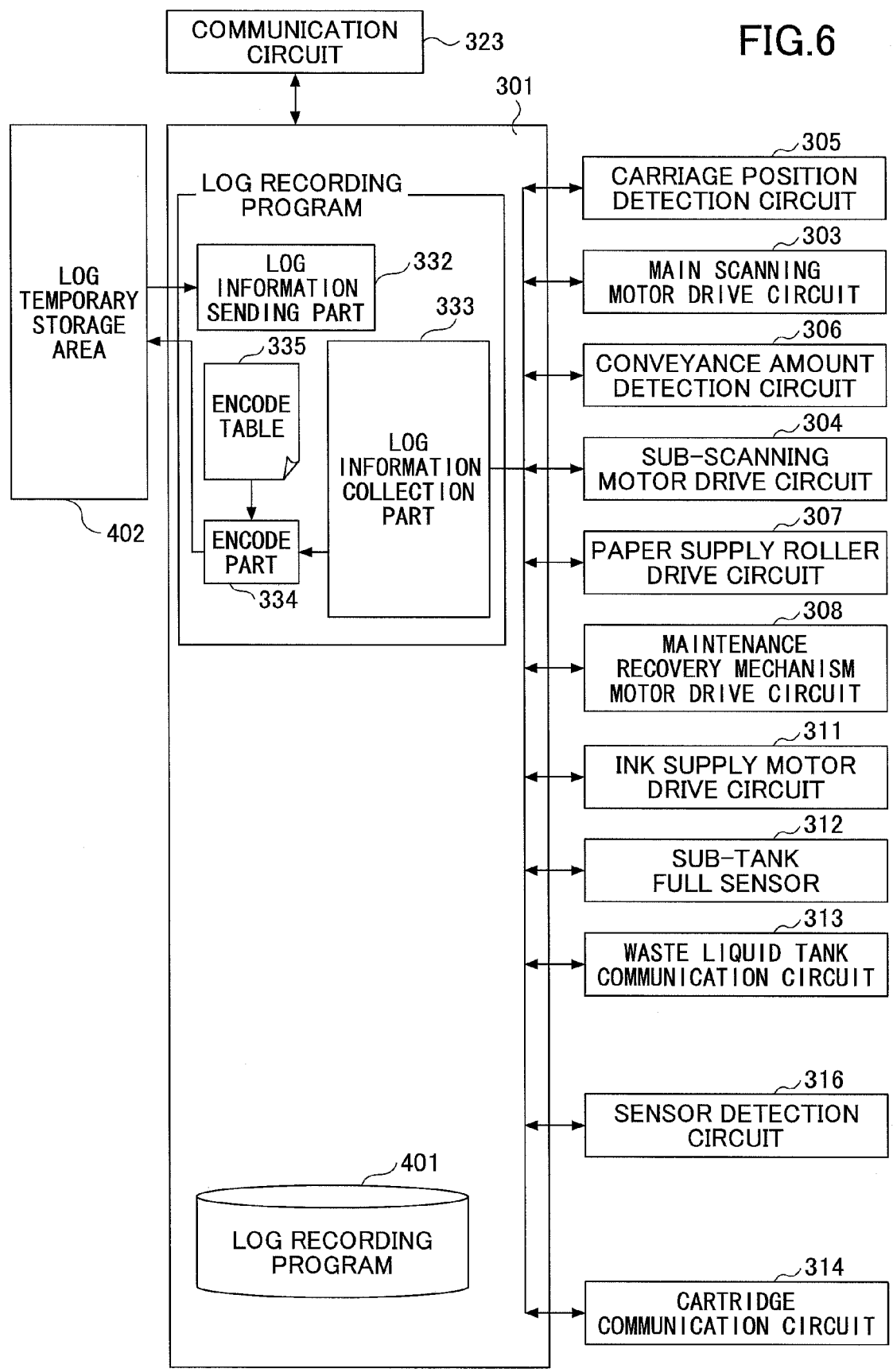
FIG. 6 is a block diagram of a log information recording structure.

FIG. 6 is a block diagram of a structure of recording log information. Although each block illustrated in FIG. 6 is a block frequently used for recording log information, log information may be acquired from other blocks or log information may not be acquired from the blocks illustrated in FIG. 6.

Each of the above-mentioned circuits retains a program for operating, and operates according the program. For example, the carriage position detection circuit 305 retains a carriage position detection program for controlling the carriage position detection circuit 305. The main-scanning motor drive circuit 303 retains a main scanning motor drive program for controlling the main scanning motor drive circuit 303. The same applies to the conveyance amount detection circuit 306, the sub-scanning motor drive circuit 304, the paper supply roller drive circuit 307, the maintenance and recovery mechanism motor drive circuit 308, the ink supply motor drive circuit 311, the waste liquid tank communication circuit 313, the sensor detection circuit 316, and the cartridge communication circuit 314. In a case of a sensor such as the sub tank full sensor 312, a similar circuit (not illustrated) may be provided, or the log information collection part 33 may request the sensor to output a detection signal.

Each program is described according to a control flow for controlling various kinds of circuit, and outputs a process path (process history) of the control flow and parameters used for the process as log information to the main control part 301. If it is a detection of a position or a detection by a sensor, a time to record the log information is immediately after the detection of the position or sensing by the sensor. If it is a control of a motor, a time to record the log information is when a parameter of the motor control changes or the recording is performed periodically. The time for recording the log information is previously determined according to the control flow.

The main control part 301 executes the log recording program 401 to record the log information. A CPU of the main control part 301 constituted by a microcomputer serves as a log information collection part 333, an encode part 334 and a log information sending part 332 by executing the log recording program 401. The log recording program 401 is stored in the EEPROM 315 or a ROM (not illustrated in the figure) of the main control part 301. The log recording program 401 is distributed by being downloaded from an external server or PC through the communication circuit 323, or distributed by being stored in a nonvolatile memory or a non-transitory recording medium such as a CD-ROM, etc. The same applies to the encode table 335, however, the encode table 335 may be described as a part of the program code in the log recording program 401.

The log information collection part 333 distinguishes the kind of log information based on the circuit or program from which the log information is received. Then, the log information collection part 333 adds necessary information, such as a time, to the log information, and outputs the log information to the encode part 334. The encode part 334 compresses the data size of the log information by encoding the log information. The encoded log information is temporarily recorded on the log temporarily recording area 402. The log temporarily recording area 402 is a ring buffer in which old log information is overwritten.

The log information sending part 332 reads the log information from the log temporarily recording area 402, and sends the log information to an external PC. Because a user sets one of modes A and B mentioned later to the image forming apparatus, the log information sending part 332 sends the log information according to one of the modes A and B.

[Log Information and Encode]

FIG. 7A illustrates an example of the log information before being encoded. FIG. 7B illustrates an example of the log information after being encoded. FIG. 7A is an example of the log information for a carriage stop detection. The log information before being encoded is expressed by character string information of characters or numerical values. In FIG. 7A, "kind of log", "output-originator program", "log generation time", and "parameter" are contained in the log information before being encoded. Because the log information collection part 333 provides the "log generation time", the carriage position detection program outputs the "kind of log", "output-originator program", and "parameter" to the log recording program 401. It should be noted that the carriage position detection program may record the "log generation time".

The log information includes a header part and a parameter part. The header part is bibliographical information of the log information such as "kind of log" and "output-originator program". If the "kind of log" is determined, the header part is determined uniquely. A time when the log information is generated or parameter information of the program when the log information is generated is stored in the parameter part. Thus, if the "kind of log" is the same, the stored value is different depending on a state. It should be noted that although the number of "parameters" varies depending on the "kind of log", the number of parameters is fixed if the "kind of log" is the same.

FIG. 8 is an illustration of the encode table 335. The encode table 335 relates identifiers to rows in each column of the log information. For example, in the column of "kind of log", a code is related to each kind name. In the example illustrated in FIG. 8, a code "1" is related to "carriage stop detection", a code "2" is related to "carriage current position detection", and a code "3" is related to "main-scanning motor operation". In the column of "output originator program", a code is related to each program name. That is, a code "1" is related to "carriage position detection program", a code "2" is related to "main-scanning motor program". In the column of "parameter", a code is related to each kind of parameter. In the example illustrated in FIG. 8, there is no code related to "stop position" and "current position", and a value itself (or a compressed and encoded value) is related to each of them, a code "1" is related to "start acceleration", a code "2" is related to "start constant speed", and a code "3" is related to "start stopping".

The encode part 334 encodes the log information according to the codes related to the rows corresponding to the column of the encode table 334. Then, the three codes of "kind name", "program name" and "kind of parameter" are combined into one code, and the combined code is converted into log information. For example, in a case where the "kind of log" is "carriage stop detection", the combined code is "11value".

Additionally, as another example of the method of encoding the parameter, there is a method of setting a code as a numeral (value) itself stored in the parameter of the program as is in "stop position" in the table. A further method is to assign a code corresponding to each control as is in "start acceleration", "stat constant speed" and "start stopping". Setting a numeral as a code is effective because the encode part 334 can record the numeral itself. However, there is a disadvantage in that an amount of codes is increased when encoded. On the other hand, the method of assigning a code corresponding to a control has an advantage in that a memory capacity for log information can be reduced when encoding known control and numerical values.

It should be noted that encoding can be achieved by compress encoding a value. The value may be encoded by reversible compression method such as a run-length method, which can compress memory amount without degrading information quality.

Figure 9:
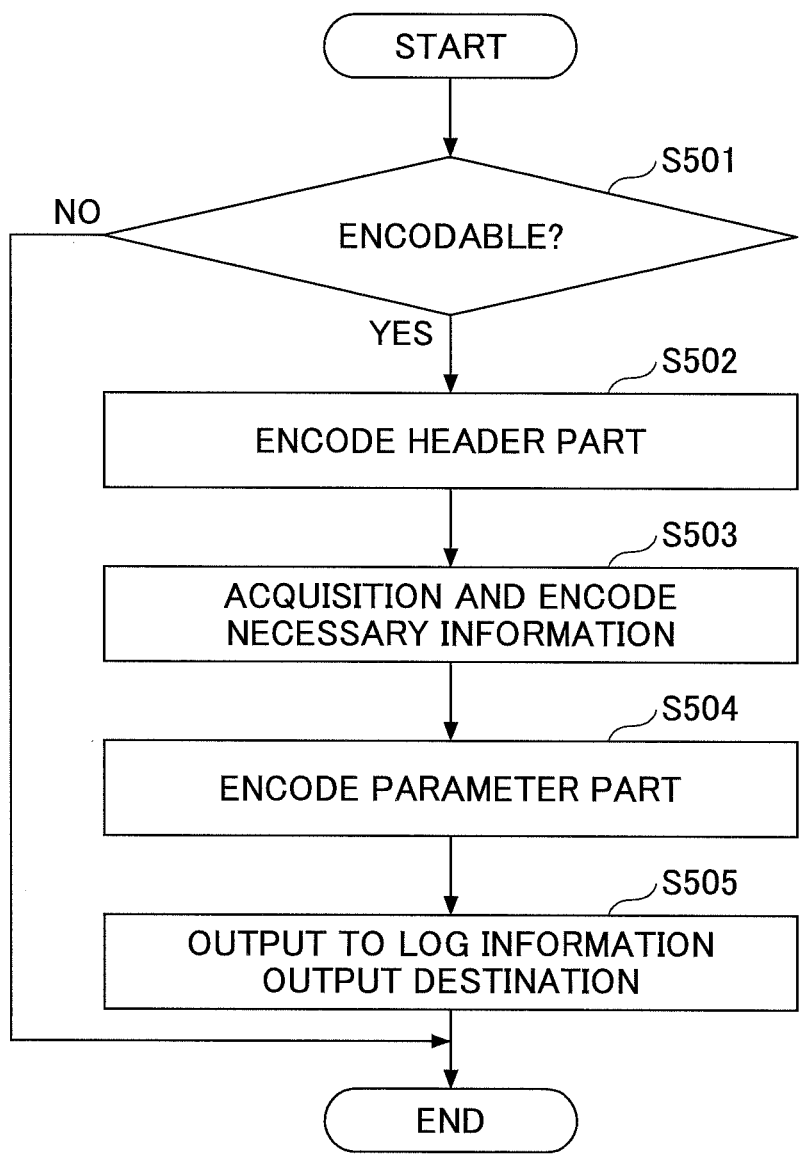
FIG. 9 is a flowchart of a procedure of encoding log information.

FIG. 9 is a flowchart of a procedure of encoding the log information by the log recording program 401. The procedure illustrated in FIG. 9 is started when the program of creating the log information of a circuit, etc., outputs the log information to the log recording program 401.

First, the encode part 334 determines whether the log information can be encoded (S501). This is because "kind of log" must be registered in the encode table 335 in order to encode the log information.

If "kind of log" is not registered in the encode table 335 (NO of S501), the encode part 334 does not encode the log information. In this case, the log information is stored in the log temporarily recording area 402.

If "kind of log" is registered in the encode table 335 (YES of S501), the encode part 334 encodes the log information. First, the encode part 334 encodes the header part (S502). The encode part 334 searches the column of "kind of log" of the encode table 335 by "kind of log" of the log information, and stores the code when coincidence occurs. Similarly, the encode part 334 searches the encode table 335, and stores a corresponding code in the "output originator program".

Then, the encode part 334 acquires and encodes necessary information (S503). The necessary information here is a time when the log information is output. The time data includes values of year, month, date, hour, minute, and second. The encode part 334 encodes the time values by computing them into elapsed seconds from a reference date (for example, Jan. 1, 2011, 00:00:00). Thereby, an amount of data can be reduced than outputting the time data without conversion.

Then, the encode part 334 encodes the parameter part (S504). If "kind of parameter" is given by a numerical value, the numerical value is stored in the parameter part of the log information without change. If "kind of parameter" of the log information is a character string, the encode part 334 searches the encode table 334 for the corresponding character string, stored the code when coincidence occurs in the "parameter".

After completion of encoding of one piece of log information, the encode part 334 outputs the log information to the output destination (S505). The output destination may be an external PC connected to the image forming apparatus 100 through the log temporarily recording area 402 and the communication circuit 322 as mentioned above. In a case where the log information is output through the communication circuit 323, the log information to be output is temporarily stored in the log temporarily recording area 402.

[Acquisition of Log Information]

A description is given below of a method of acquiring log information from an external part. There are the following two modes A and B.

A) mode for sending log information upon request from PC by previously storing log information in a log temporarily recording area (within the apparatus)

B) mode for outputting log information to PC in real time from the image forming apparatus 100 through the communication circuit 323

A description will be given of a method of acquiring log information in each of the modes A and B.

Figure 10:
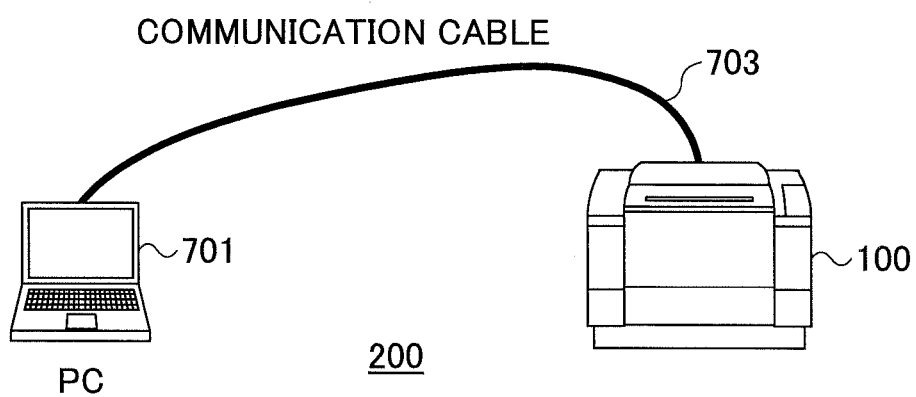
FIG. 10 is an illustration for explaining acquisition of encoded log information.

FIG. 10 is an illustration for explaining acquisition of encoded log information. A personal computer (PC) 701 is connected to the image forming apparatus 100 via a communication cable 703 to form a log information acquisition system 200. Although the PC 701 is connected to the image forming apparatus by the exclusive line (communication cable 703 in the example illustrated in FIG. 10), they may be connected through a network. The communication cable 703 may be, for example, a serial communication cable, a USB cable, a LAN cable, etc. Software for acquiring log information from the image forming apparatus 100 is mounted in the PC 701.

When acquiring log information stored in the image forming apparatus 100 according to the mode A, a command for acquiring log information is sent from the software mounted in the PC 701 for acquiring log information.

Upon reception of the command, the image forming apparatus 100 sends to the PC 701 necessary log information from among pieces of log information retained by the image forming apparatus 100. The software for acquiring log information mounted in the PC 701 displays the received data as log information.

When the image forming apparatus 100 outputs log information to the PC 701 through the communication circuit 323 according to the mode B, the PC 701 is continuously set in a state where the software for acquiring log information is activated. The image forming apparatus 100 output the log information through the communication cable 703 without receiving a command from the PC 701.

The software for acquiring log information mounted in the PC 701 always monitors whether data is received through the communication cable 703. If data is received through the communication cable 703, the software displays the received data as log information.

Figure 11A:
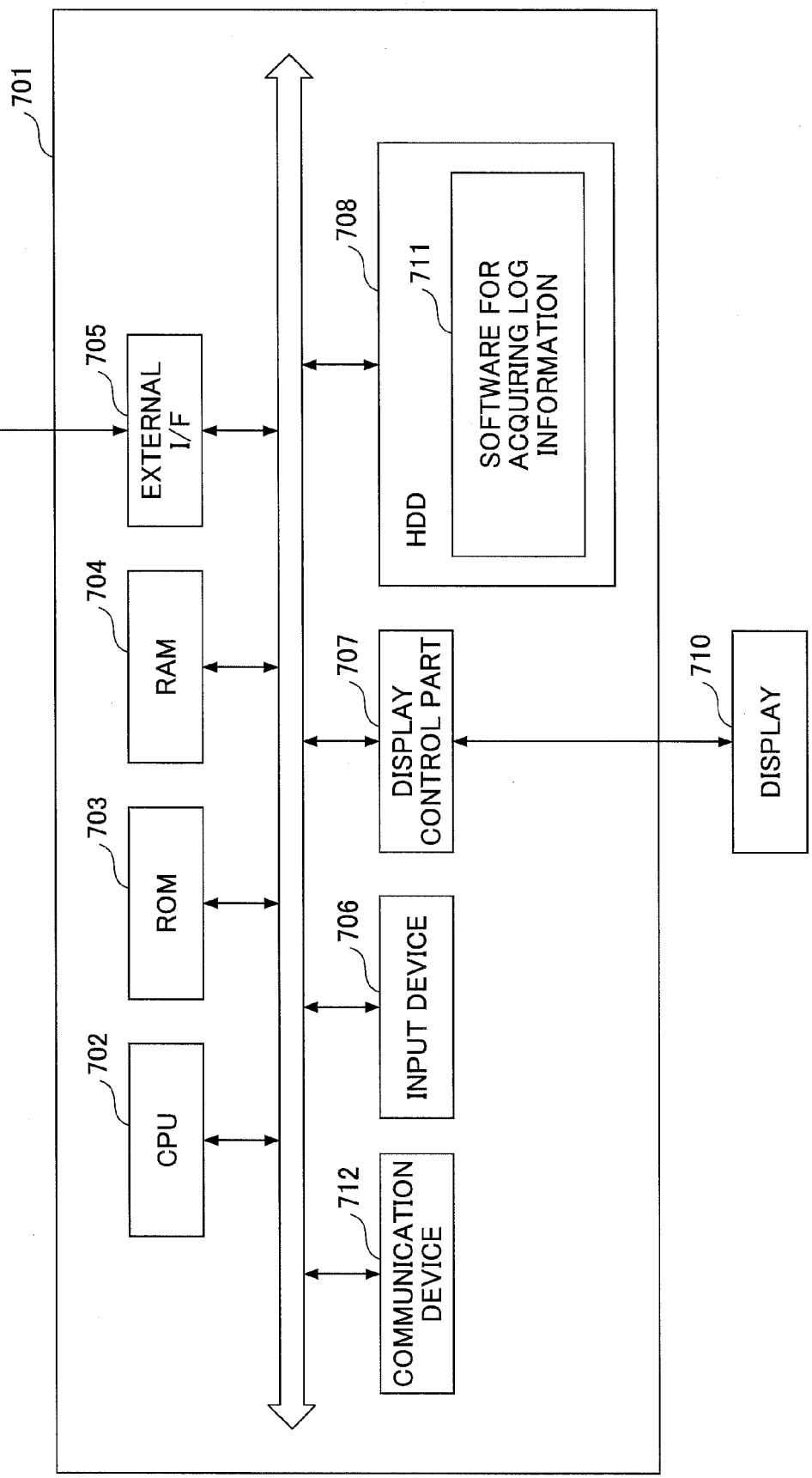
FIG. 11A is a block diagram of a hardware of a personal computer.

FIG. 11A is a block diagram of a hardware structure of the PC 701. The PC 701 includes a CPU 702, a ROM 703, a RAM 704, an external I/F 705, a communication device 712, an input device 706, a display control part 707 and a HDD 708, which are mutually connected by a bus. The CPU 702 reads the software 711 for acquiring log information from the HDD 708, and executed the software using the RAM as a work memory. The software 711 for acquiring log information is a program for acquiring log information from the image forming apparatus 100 as mentioned later. The software 711 may be distributed by being stored in a storage medium 709 or by being downloaded from a server (not illustrated in the figure) through a communication device 712.

The RAM 703 serves as a work memory (main storage memory) for temporarily storing necessary data. The ROM 704 stores BIOS, initially set data, a boot-up program, etc. The external I/F 705 is an interface to connect a cable such as a USB cable and the portable storage medium 709 to the image forming apparatus 100. The storage medium 709 is a flash memory such as a USB memory, or an optical storage medium such as a CD-ROM.

The communication device 712 may be a LAN card or Ethernet (registered trade mark), which sends data to a computer connected through a network in accordance with an instruction from the CPU 702 and sends a notification of the received data to the CPU 702. The input device 706 may be a keyboard, a mouse, a touch panel integrally formed with the display 710, etc. The display control part 707 may be, for example, a graphic chip, which analyzes screen information regarding a resolution and color number which the software 711 for acquiring log information requested, and outputs the results of analysis to the display 711. The HDD may be a non-volatile memory, or may be a solid state drive (SSD) or a USB memory.

FIG. 11B is a functional block diagram of the software 711 for acquiring log information of the PC 701. The software 711 includes an instruction reception part 721, screen creation part 723, a command sending part 722, an original data conversion part 724, a log information acquisition part 725, ad an encode table 335.

<Mode A>

A description is given below of the mode A. When a user operates the PC 701 to acquire log information, the screen creation part 723 displays a log setting screen on the display 710.

Figure 12:
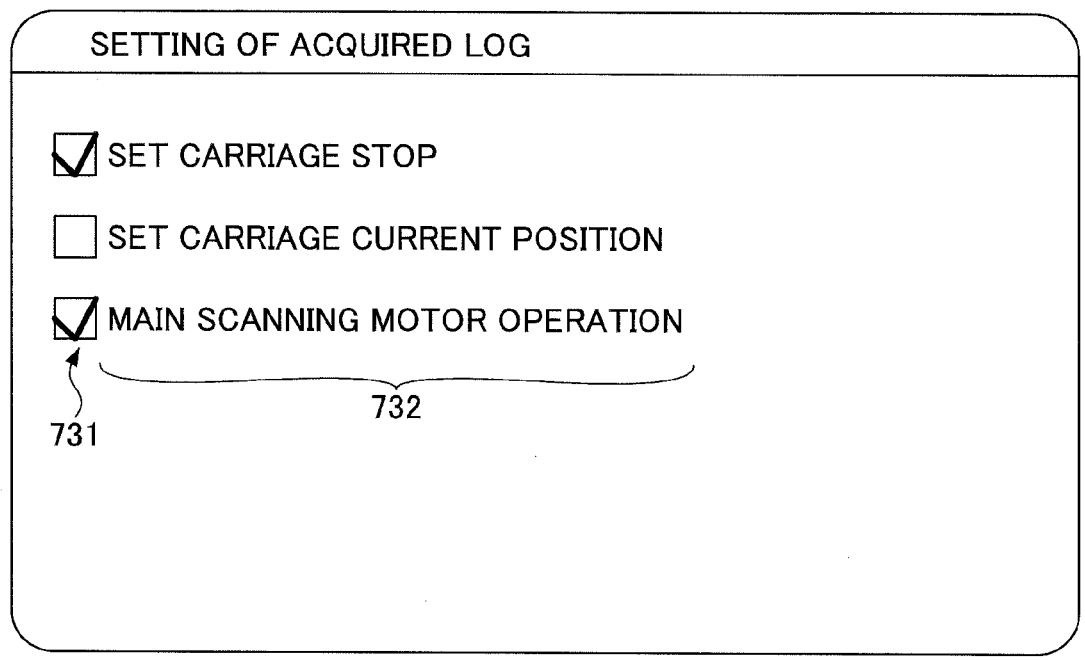
FIG. 12 is an illustration of a log setting screen displayed on a display of the personal computer.

FIG. 12 illustrates an example of the log setting screen displayed on the display 710 of the PC 701. It should be noted that the log setting screen is common to the modes A and B. The "kind of log" 732, which is information selectable by a user and check boxed 731 for receiving a selecting operation are displayed on the log setting screen. When a user selects one of the check boxes 731 using a mouse or pointing device, the screen creation part 723 displays a check mark in the one of the check boxes 731. The user can select a plurality of pieces of log information.

When the user presses an enter button or OK button (not illustrated in the figure), the instruction reception part 721 receives the "kind of log" corresponding to the check box 731 which is given a check mark. Thereby, the instruction reception part 721 can acquire the log information which the user selected.

The command sending part 722 converts the "kind of log" notified by the instruction reception part 721 into a command, and sends it to the image forming apparatus 100. The command contains an acquisition request of log information and the "kind of log". It is one of the features that not character string information but a code is sent as the "kind of log" in the present embodiment.

The log recording program 401 of the image forming apparatus 100 reads the log information of "kind of log" requested by the command from among pieces of log information stored in the log temporarily recording area 402, and sends it to the PC 701.

The log information acquisition part 725 receives the log information from the image forming apparatus 100, and outputs it to the original data conversion part 724. The original data conversion part 724 converts the log information acquired from the image forming apparatus 100 into the character string information, and outputs it to the screen creation part 723. The screen creation part displays the log display screen which indicates the log information on the display 710.

<Mode B>

A description is given below of the mode B. A user may previously set the "kind of log" which is to be acquired by the PC through the log setting screen illustrated in FIG. 12. If the "kind of log" is not set, all "kind of log" can be acquired.

When the software for acquiring log information is always activated in the PC 701, there is no need to send a command by the command sending part 722, and the log information acquisition part 725 acquires the log information. More specifically, the communication circuit 712 connected to the PC 701 interrupts the CPU so that CPU executes a protocol stack of TCP/IP. The protocol stack of TCP/IP specifies the software 711 for acquiring log information based on a port number of a destination address of the received communication data, and sends the log information to the log information acquisition part 725.

FIG. 13A is an illustration of an example of log display screen displayed on the display 710 of the PC 701 in the mode A. For example, one piece of log information is displayed on one line in the log display screen. In FIG. 13A, the log information of "carriage stop detection" and "main-scanning motor operation", which is the "kind of log" selected by the user through the log setting screen illustrated in FIG. 12 is displayed in a time-series order. The time-series order is determined based on the "log generation time" of the log information. It should be noted that the order of display may be an alphabetical order, a character code order, or previously determined "kind of log" order.

The user can operate so that only the log information of a specific kind is displayed on the log display screen. Thereby, for example, only the "carriage stoop detection", only the "carriage current position detection" or only the "main-scanning motor" can be displayed, which allows the user to easily analyze the log information.

Also when there are a plurality of pieces of log information of the same kind (for example, there area a plurality of pieces of "carriage stop detection"), the screen creation part 723 displays a plurality of pieces of log information by sorting for each piece of log information of the same kind in a time-series order. Thereby, the user can check log information of the past from among the pieces of log information of the same kind. An amount of log information of the past which can be acquired is limited by the memory capacity of the log temporarily recording area 402.

Additionally, in order to improve the analysis efficiency of log information, the user can cause, for example, specific log information to be displayed by highlighting.

FIG. 13B is an illustration of an example of the log display screen displayed on the display 710 of the PC 701 in the mode B. Also in FIG. 13B, for example, one piece of log information is displayed on one line. Although the "kind of log" which the user acquires through the log setting screen can be set also in the mode B, if such setting is not made by the user, all pieces of log information that have been created are displayed on the log display screen in a time-series order.

Because an amount of log information increases with passage of time in the mode B, the user can check the log information of the past by operating a slide bar. Additionally, the log information may be displayed for each "kind of log" in a time-series order according to an operation by the user. The log information of specific kind may be displayed with highlighting, or the log information of the latest may be displayed with highlighting.

Figure 14:
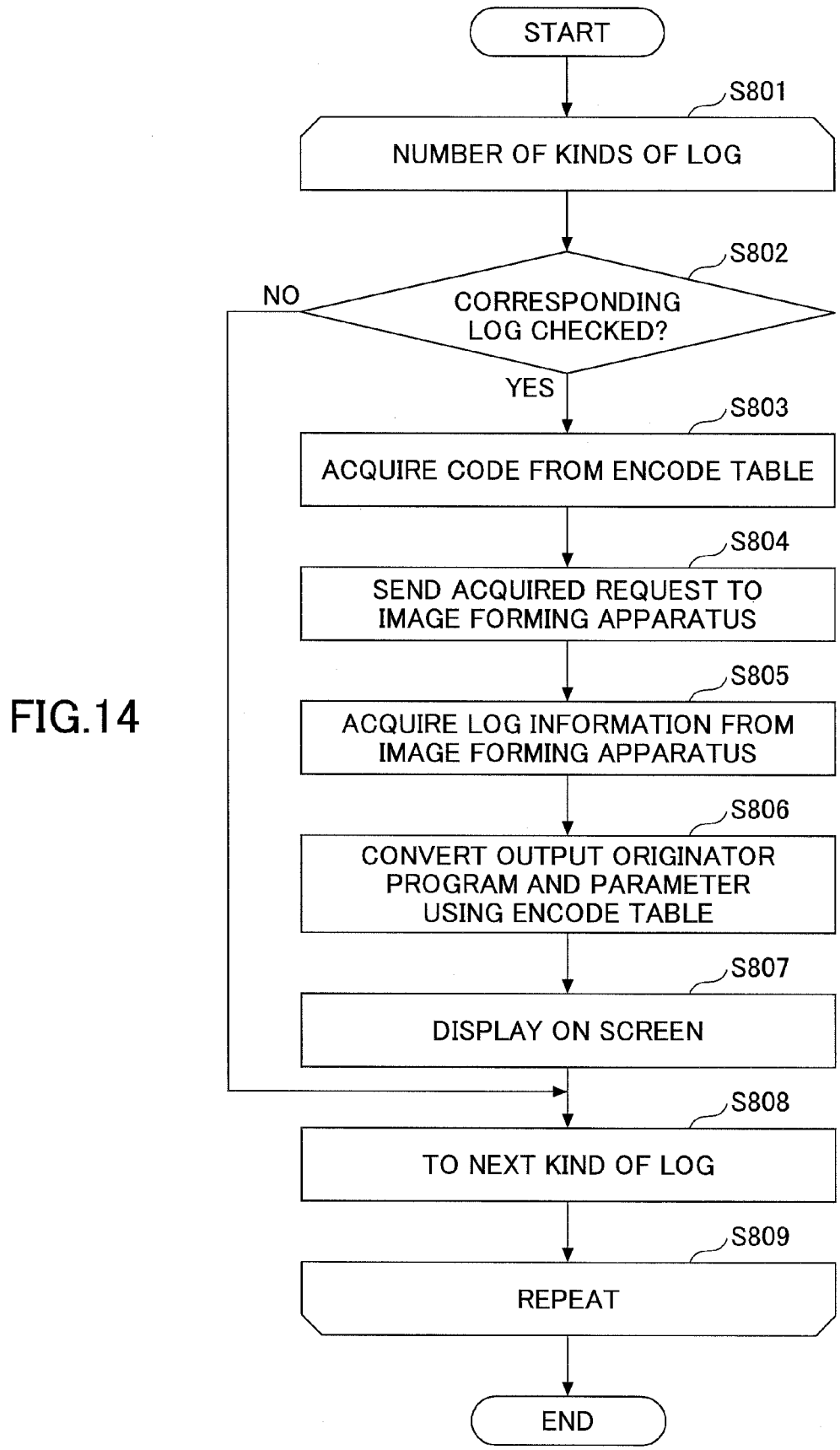
FIG. 14 is a flowchart of a procedure of acquiring log information from a log temporary storage area of the image forming apparatus.

FIG. 14 is a flowchart of a procedure performed by the PC 701 to acquire log information, which is selected by a user, from the log temporarily recording area of the image forming apparatus 100. The process of FIG. 14 is repeated for a number of pieces of "kind of log" (S801).

First, the instruction reception part 721 determines whether the "kind of log", which is currently being taken into consideration, is checked (selected) by the user by referring to a list of "kind of log" such as an encode table (S802). If the "kind of log", which is currently being taken into consideration, is not selected (NO of S802), the instruction reception part 721 focuses attention on a next "kind of log" (S808).

If the "kind of log", which is currently being taken into consideration, is selected (YES of S802), the command sending part 722 reads a code corresponding to the "kind of log", which is currently being taken into consideration, from the encode table 335 (S803).

Then, the command sending part 722 sends the "kind of log" (code) to the image forming apparatus 100 together with an acquisition request of log information (S804).

On the other hand, the image forming apparatus 100 reads log information, which is coincident with the "kind of log" (code) sent from the PC 701, from the log temporarily recording area 402, and sends it to the PC side together with "output originator program", "log generation time" and "parameter". The log information acquisition part 725 of the PC side acquires the log information sent from the image forming apparatus 100 (S805).

Then, the original data conversion part 724 converts the encoded log information into log information of character log information by referring to the encode table 335 (S806). That is, the original data conversion part 724 converts the codes of "kind of log", "output originator program" and "parameter" into character strings, respectively.

The screen creation part 723 displays the log information, which is a result of the conversion, on the log display screen (S807). After the acquisition of the log information corresponding to the "kind of log", which is being taken into consideration, the software 711 for acquiring log information applies the same process to a next "king of log".

FIG. 15 is flowchart of a procedure of displaying log information on the display 710, which is sent from the image forming apparatus 100 through the communication circuit 323 without a command sent from the PC 701, on the display 710.

The log information acquisition part 725 determines whether log information was transmitted from the image forming apparatus 100 (S901). The determination may be made by interruption as mentioned above, or may be determined by periodically checking a state of a flag, which is turned on, for example, when log information is received.

When log information is input (YES of S901), the log information acquisition part 725 acquires the log information from the communication circuit 323 (S902).

Then, the original data conversion part 724 specifies the code of "kind of log" included in the log information in the encode table 335 in order to analyze the log information (S903).

Then, the original data conversion part 724 reads the "kind of log" related to the specified code from the encode table 335, and converts it into a character string (S904).

Furthermore, because the log information contains the codes of "output originator program" and "parameter", they are converted into character strings by using the encode table 335. The result of conversion is sequentially displayed by the screen creation part 723 on the display 710 (S906). The newest log information is displayed on a lowermost line or an uppermost line of the log display screen.

As explained above, the image forming apparatus 100 according to the present embodiment can remarkably reduce the storage capacity of log information because the log information is converted into a code. Additionally, because an amount of log information is reduced, a load given to the image forming apparatus 100 when recording log information can be reduced. Because an amount of information is reduced by being encoded and it can be retrieved according to the code, the retrieval of log information from the PC can be performed easily.

Although the image forming apparatus and the information processing apparatus were described according to the embodiments, the present invention is not limited to the specifically disclosed embodiments, and variations and modifications may be made without departing from the scope of the present invention.

The present invention is based on Japanese priority application No. 2011-116116 filed on May 24, 2011, the entire contents of which are hereby incorporated herein by reference.

What is claimed is:

1. An image forming apparatus, comprising:
a central processing unit configured to execute functions of the image forming apparatus;
an operation result output part configured to output a result of operation of a component;
an operation result information creation part configured to create operation result information having identification character information regarding the result of operation of said component, the identification character information being determined based on said component or the result of operation of said component;
a first identifier table in which the identification character information is associated with a first unique identifier and the result of operation of said component is associated with a second unique identifier;
an operation result information conversion part configured to read the first identifier from said first identifier table and convert the operation result information by replacing at least the identification character information with the first identifier;
an operation result information storage part configured to store the converted operation result information, and
a first communication part configured to receive, from an external device, a request of sending all of the converted operation result information that belongs to a kind of the operation result information selected by a user at the external device; and
an operation information sending part configured to read all the converted operation result information stored in said operation result information storage part of which identifier is coincident with an identifier of the identification character information contained in said sending request and send all the read converted operation result information that belongs to the kind of the operation result information selected by the user at the external device to said external device.

2. The image forming apparatus as claimed in claim 1, wherein, when setting of sending the converted operation result information to said external device is received, said operation information sending part sends to said external device the converted operation result information which is converted by said operation result information conversion part without receiving said sending request of the converted operation result information by said first communication part.

3. The image forming apparatus as claimed in claim 1, wherein when the result of operation of said component is a numerical value, said operation result information conversion part converts the operation result information into the converted operation result information by replacing only the identification character information with the first identifier without changing the numerical value of the result of operation of said component.

4. An information processing apparatus communicable with the image forming apparatus as claimed in claim 1, comprising:
a second communication part configured to communicate with said image forming apparatus;
a second identifier table in which the identification character information is associated with and the first unique identifier and the result of operation of said component is associated with the second unique identifier;

a selection reception part configured to receive selection of operation result information to request, which is to be requested for sending;

a sending request part configured to read from said second identifier table the first identifier contained in the operation result information received by said selection reception part and send the read first identifier to said image forming apparatus together with the request of sending all the converted operation result information that belongs to a kind of the operation result information selected by a user at the information processing apparatus;

an operation result information acquisition part configured to acquire the all the converted operation result information that belongs to the kind of the operation result information selected by the user at the information processing apparatus from said image forming apparatus;

an operation result conversion part configured to convert the first identifier contained in said converted operation result information into the identification character information and the result of operation of said component based on said second identifier table; and a screen display part configured to display the identification character information and the result of operation of said component on a screen of a display apparatus.

5. An information processing apparatus communicable with the image forming apparatus as claimed in claim 1, comprising:

a second communication part configured to communicate with said image forming apparatus;

a second identifier table in which the identification character information is associated with the first unique identifier and the result of operation of said component is associated with the second unique identifier;

an operation result information acquisition part configured to acquire the converted operation result information from said image forming apparatus;

an operation result conversion part configured to convert the first identifier contained in said converted operation result information into the identification character information and the result of operation of said component based on said second identifier table; and a screen display part configured to display the identification character information and the result of operation of said component on a screen of a display apparatus.

6. A non-transitory storage medium storing a program to cause an image forming apparatus, which forms an image on a recording medium, to perform the steps of:

collecting results of operation of a component output by an operation result output part;

creating operation result information having identification character information regarding the result of operation of said component, said identification character information being determined by said component or the result of operation of said component;

reading an identifier associated with the identification character information from an identifier table and converting the operation result information by replacing at least the identification character information of the operation result information with the identifier;

storing the converted operation result information in an operation result information storage part, receiving, from an external device, a request of sending all the converted operation result information that belongs to a kind of the operation result information selected by a user at the external device; and reading all the converted operation result information stored in said operation result information storage part of which identifier is coincident with an identifier of the identification character information contained in said sending request, and sending all the read converted operation result information that belongs to the kind of the operation result information selected by a user at the external device to said external device.

* * * * *